United States Patent
Russell

[15] 3,644,108
[45] Feb. 22, 1972

[54] METHOD AND APPARATUS FOR PRODUCING FILAMENTS BY CENTRIFUGAL FORCES

[72] Inventor: Robert G. Russell, Granville, Ohio
[73] Assignee: Owens-Corning Fiberglas Corporation
[22] Filed: Jan. 23, 1969
[21] Appl. No.: 793,269

[52] U.S. Cl..............................65/8, 65/12, 65/15
[51] Int. Cl. ..................................C03b 37/04
[58] Field of Search..................65/1, 2, 4, 9, 11 R, 11 W, 65/12, 6, 8, 14, 15, 21

[56] References Cited

UNITED STATES PATENTS

| 3,179,507 | 4/1965 | Levecque et al.............................65/6 |
| 3,294,503 | 12/1966 | Machlan et al. ............................65/1 |
| 2,936,480 | 5/1960 | Kleist....................................65/14 X |
| 2,984,864 | 5/1961 | Levecque et al.............................65/8 |

FOREIGN PATENTS OR APPLICATIONS

| 266,857 | 2/1950 | Switzerland ...............................65/14 |

*Primary Examiner*—S. Leon Bashore
*Assistant Examiner*—Robert L. Lindsay, Jr.
*Attorney*—Staelin & Overman and Harry O. Ernsberger

[57] ABSTRACT

The disclosure embraces a method of and apparatus for producing fine fibers or filaments of heat-softenable material such as glass and involves the formation of discrete streams of heat-softened glass of comparatively low viscosity by centrifugal forces, and dissipating or transferring heat from the streams to moving surfaces having passageway to accommodate a cooling liquid to thereby increasing the viscosity of the material of the streams to enable the attenuation of the streams by centrifugal action to fibers or filaments.

12 Claims, 5 Drawing Figures

PATENTED FEB 22 1972 3,644,108
SHEET 1 OF 3
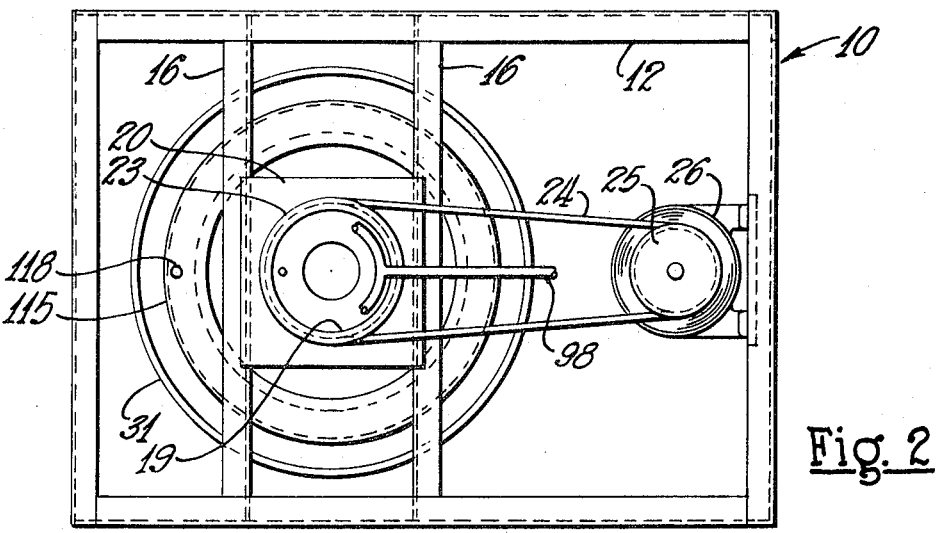
Fig. 2
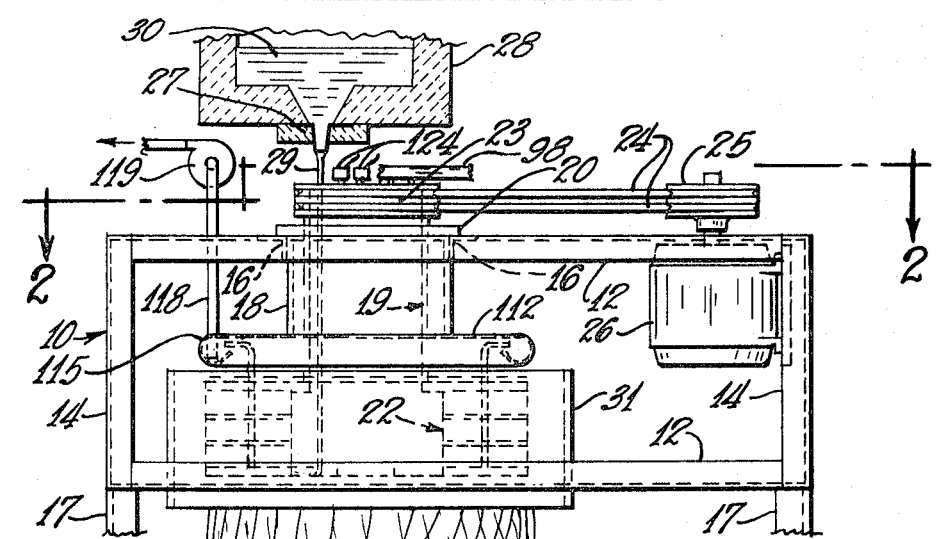
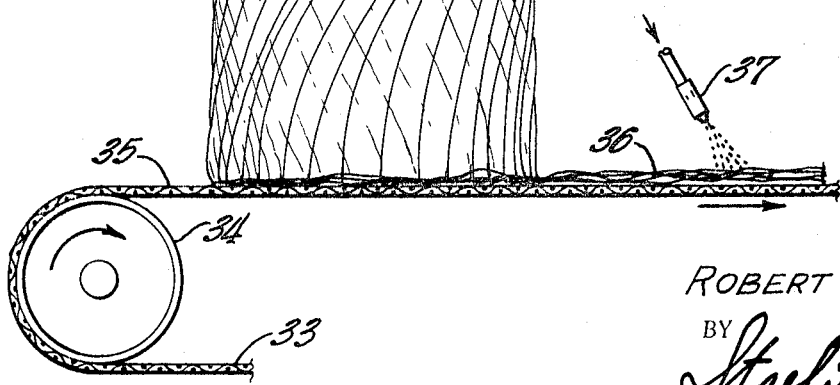
Fig. 1
INVENTOR.
ROBERT G. RUSSELL
BY
Staelin & Overman
ATTORNEYS

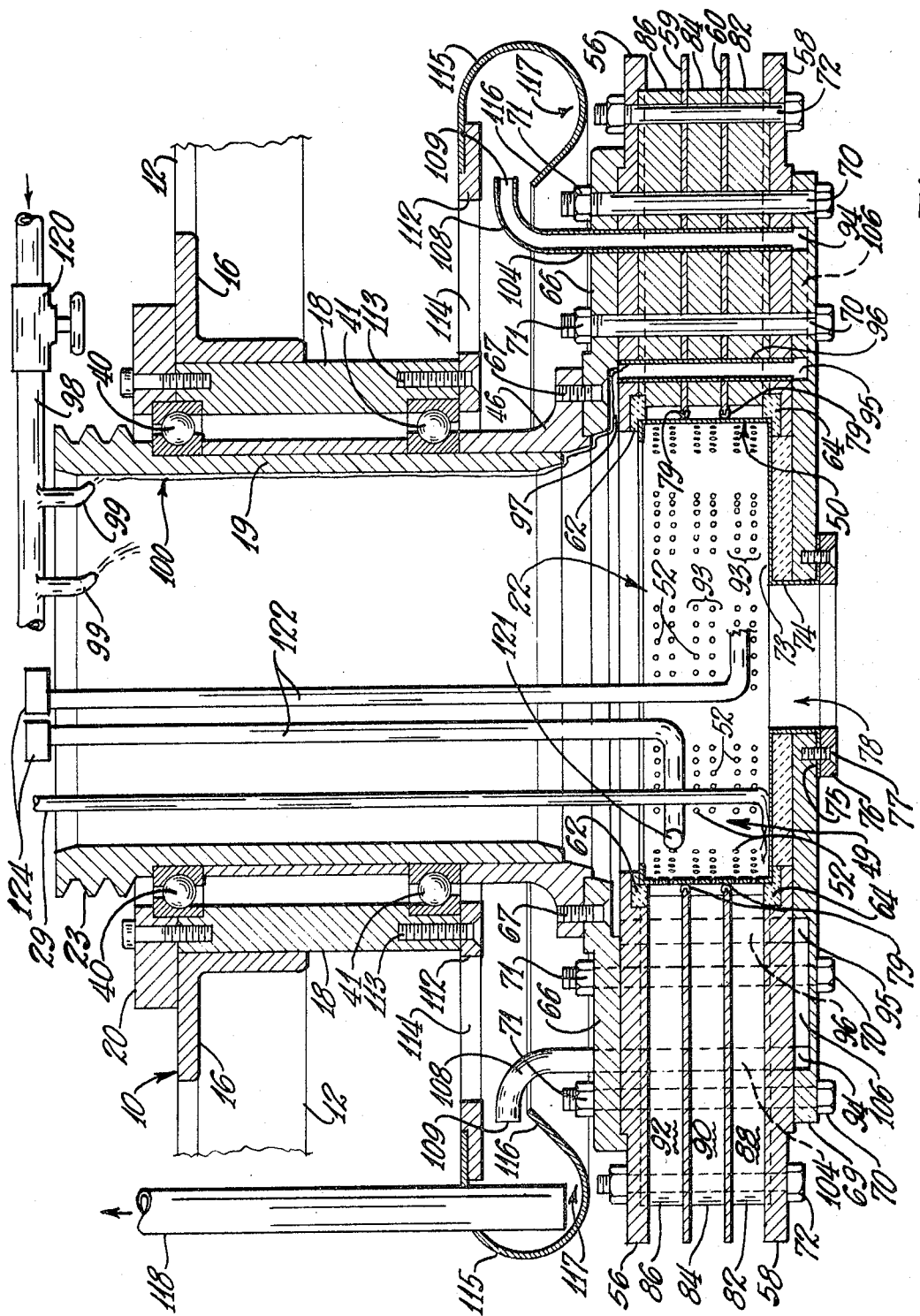

INVENTOR.
ROBERT G. RUSSELL
BY
Staelin & Overman
ATTORNEYS

METHOD AND APPARATUS FOR PRODUCING FILAMENTS BY CENTRIFUGAL FORCES

The invention relates to the method of and apparatus for processing heat-softened glass in the production of fine glass fibers or filaments which are attenuated from bodies or streams of glass projected from a rotating body or surface wherein the bodies or streams of glass are conditioned to a viscosity whereby they may be effectively and efficiently formed into fibers or filaments by centrifugal forces. The invention is of particular importance in producing substantially continuous fine filaments of glass utilizing centrifugal force as the medium or means for attenuating bodies or streams of heat-softened glass.

Continuous filaments of glass have been produced by conventional methods wherein streams of molten glass flowing from a stationary feeder are attenuated into continuous fibers or filaments which are gathered into a strand and wound into a package, the winding of the strand of filaments attenuating the streams to filaments. In such processes the streams are flowed through orifice projections provided on the floor of a stream feeder, the heat-softened glass being supplied to the stream feeder by some conventional form of melting arrangement such as a melting furnace wherein the molten glass flows through a forehearth thence into one or more stationary bushings or stream feeders, or wherein prerefined pieces or marbles of glass are reduced to a molten condition in a melter directly associated with the stream feeder.

In such processes the streams of glass flowing from the feeder neck down to form conelike bodies of glass depending from the orificed tips and the filaments or fibers are drawn from the conelike bodies of the glass. The cohesive forces which transmit the attenuation forces from the filaments to the bodies of the cones of glass are closely related to the viscosity of the glass. Surface tension of the glass is also involved in the transfer of attenuating forces to the cones of glass and causes constriction or necking of the glass of the streams into the conical configuration.

In order to flow glass streams of uniform size and characteristics through the many orifices in the floor of a stream feeder, the glass must be at a high temperature and a corresponding low viscosity, that is, a highly fluid glass. Streams of highly fluid glass cannot be satisfactorily attenuated into filaments or fibers. To overcome this difficulty in attenuating streams from a stationary stream feeder it has been a practice to employ stationary metal shields or fins arranged between rows of glass streams adjacent to but out of contact with the cones of the streams, the shields being water cooled to rapidly convey away heat from the streams thereby raising the viscosity of the streams to a range within which the streams may be efficiently and effectively attenuated into fibers or continuous filaments.

The use of stationary metal shields for the purpose is disclosed and described in my U.S. Pat. No. 2,908,036 and the arrangement shown in the patent is successfully employed in producing continuous filaments commercially by winding the filaments into a package on a rotating forming tube, or utilizing a mechanically driven pull wheel engaging a strand of the filaments to effect mechanical attenuation of the streams to filaments.

The present invention embraces a method of forming fibers or filaments of heat-softened mineral material, such as glass, wherein bodies of heat-softened glass are projected in lateral directions in heat-transferring relation with moving surfaces and heat from the bodies absorbed by the surfaces thereby increasing the viscosity of the glass of the bodies and conditioning the bodies for attenuation to fibers or filaments.

An object of the invention embraces a method of forming fibers or substantially continuous filaments of heat-softenable mineral materials, such as glass, wherein streams or bodies of the heat-softened glass are projected from a rotating surface by centrifugal forces and the fibers or filaments attenuated from the streams or bodies by the centrifugal forces in a heat transfer or heat dissipation environment for conditioning the streams or bodies in a viscosity range whereby they may be successfully attenuated to fibers or filaments.

Another object of the invention involves a method of projecting bodies of glass by centrifugal forces and attenuating the bodies to substantially continuous filaments by the centrifugal forces and circulating a heat transfer medium adjacent the streams and filaments to convey heat away from the streams and filaments providing an environment for increasing the viscosity of the streams and thereby facilitate improved attenuation.

Another object of the invention embraces a method of projecting stream of glass in lateral directions and conveying heat away from the streams by a moving fluid to increase the viscosity of the streams for improved attenuation of the streams to fine filaments.

Another object of the invention involves projecting streams of glass from a moving body adjacent a moving heat-transferring environment and transferring heat from the streams to the environment to increase the viscosity of the glass of the streams whereby filaments attenuated from the streams by centrifugal forces are of uniform size and of improved quality.

Another object of the invention resides in an apparatus for producing substantially continuous filaments wherein streams of heat-softened glass are projected outwardly from a rotating body and attenuated to filaments and groups of the filaments moved through walled chambers for transferring heat away from the glass streams and the filaments and isolating the groups of streams and attenuated filaments from the ambient atmosphere during attenuation of the streams to filaments.

Another object of the invention resides in apparatus for forming substantially continuous filaments by centrifugal forces wherein streams of heat-softened glass from a supply in a thin walled rotor are projected through orifices in the rotor wall and the rotor embraced by heat-transferring members to effect rapid transfer of heat away from the projected streams and wherein the rotor may be rotated at a comparatively high speed by reason by the reinforcement for the rotor provided by the heat transfer members.

Another object of the invention resides in an arrangement for forming filaments of glass through the delivery in lateral directions of glass streams through orifices in a hollow thin-walled body embraced by heat-transfer plates and laterally extending partitions, the plates and the partitions being cooled by a circulating fluid enabling high speed rotation of the body as the major stresses on the body are resisted by the heat transfer plates and partitions thus promoting a high yield of high strength filaments or fibers rendering the process commercially economical.

Another object of the invention resides in an arrangement for producing substantially continuous filaments of glass projected through orifices in a peripheral wall of a thin-walled rotor or spinner fashioned of platinum alloy, the rotor being surrounded by heat transfer plates of base metal providing reinforcement for the platinum alloy rotor enabling the amount of platinum alloy required for the rotor to be substantially reduced.

Another object of the invention resides in an arrangement wherein a thin-walled rotor having orifices through which streams of heat-softened glass are projected and attenuated to filaments in conjunction with fluid-cooled metal shields or fins enable the use of inexpensive glass composition as the glass in the rotor may be maintained at a much higher temperature to facilitate the formation of uniform glass streams, the viscosity of the streams being rapidly increased by reason of the effective transfer of heat from the glass to the shields.

Another object of the invention involves an arrangement wherein groups of streams or bodies of glass are projected in stacked relation from a rotating surface by centrifugal forces and the bodies attenuated to groups of fibers or filaments by centrifugal forces and wherein the groups are isolated one from another by circumferentially spaced fluid cooled partitions whereby an isolated moving environment is provided for each group to effect substantially uniform transfer of heat from each of the streams of the groups and attenuated filaments so that the attenuation of the filaments is substantially uneffected by air currents.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic elevational view of an arrangement for carrying out the method or process of the invention;

FIG. 2 is a top plan view of the construction shown in FIG. 1, the view being taken substantially on the line 2—2 of FIG. 1;

FIG. 3 is an enlarged vertical sectional view through the rotor and rotor support means;

Figure 4:
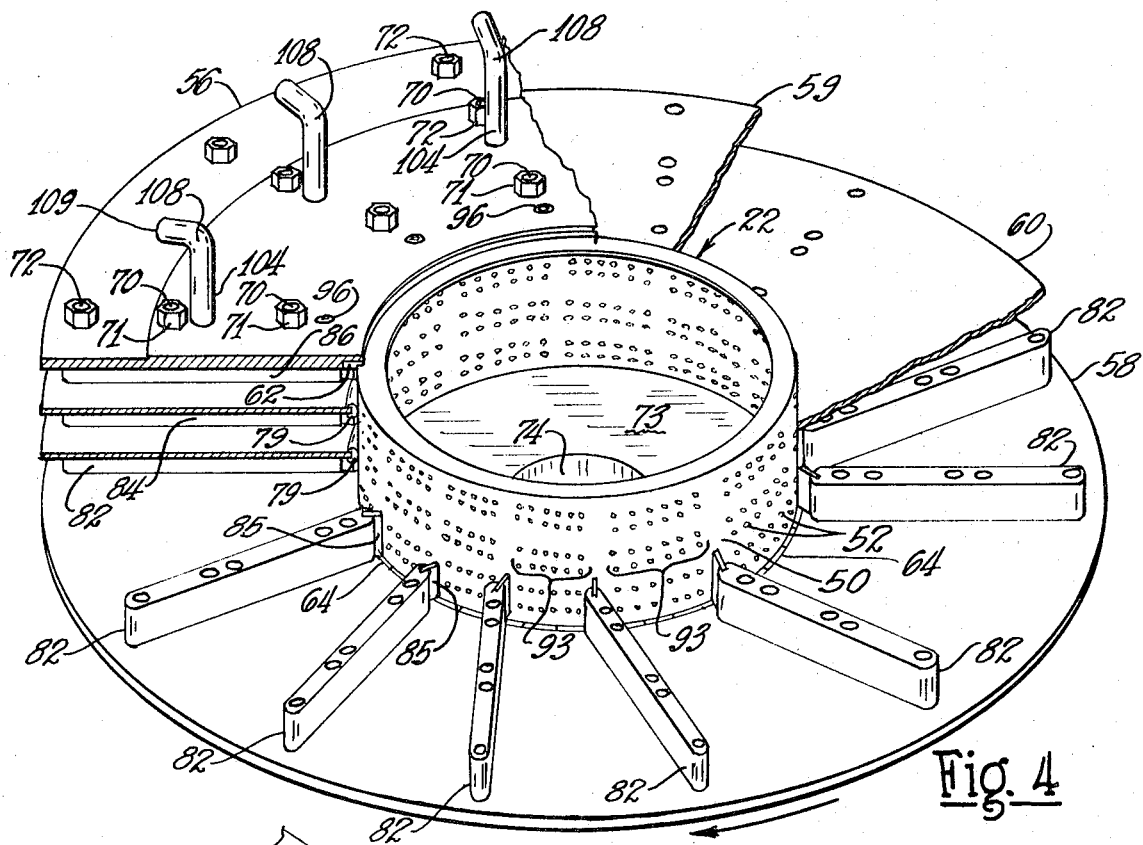
FIG. 4 is a perspective view of the spinner section and the circular plates and partition walls defining the filament attenuating regions, portions being broken away for purposes of illustration.

While the method and apparatus of the invention are particularly usable for processing heat-softened glass to form substantially continuous fibers or filaments of glass by centrifugal forces, it should be understood that the method and arrangement may be employed for forming fibers or filaments from other fiber-forming materials, such as argillaceous rock or slag.

Referring initially to FIGS. 1 and 2, the apparatus illustrated for carrying out the method of the invention is inclusive of a frame structure or support means 10 comprising lengthwise arranged pairs of members or rails 12, end frame constructions 14 and transversely extending members 16. The frame 10 is mounted upon conventional struts 17 anchored to a floor or other foundation. The transverse members 16 provide support for a cylindrically shaped member or sleeve 18 secured to a plate 20, the latter being mounted by the transversely extending frame members 16.

Journally mounted for rotation within the sleeve 18 is a tubular member or quill 19 supporting a rotating body, spinner or rotor construction 22, shown in FIG. 3 and hereinafter described. The upper region of the tubular member 19 is equipped with a sheave 23 driven by belts 24 from a sheave 25, the latter being driven by a motor 26. The hollow quill or tubular member 19 accommodates a free-falling stream of heat-softened or molten glass 29 delivered through an opening in a feeder plate 27 secured to the floor of a forehearth 28, the latter provided with a forehearth channel 30 which receives heat-softened refined glass from a conventional melting furnace (not shown).

The glass of the stream engages a rotating surface and is delivered by centrifugal forces to an orifice wall region of the rotor or spinner and groups of streams of the glass projected through the orifices are attenuated by centrifugal forces to groups of substantially continuous fibers or filaments 32, the method and apparatus for processing the glass into fibers or filaments being hereinafter described in further detail. A circular metal band or guard 31 surrounds the rotor or spinner construction and is supported by the frame 10.

The groups of fibers or filaments 32 may be collected in any suitable manner. As shown in FIG. 1, an endless belt conveyor 33 is mounted on rolls 34, one of which is shown in FIG. 1, one of the rolls being driven by a motor through speed-reducing mechanism (not shown) in a well-known conventional manner to advance the upper flight 35 of the conveyor at a comparatively slow speed in a right-hand direction. The fibers or filaments 32, whether continuous or broken, are collected upon the upper flight 35 of the conveyor as a mass or mat 36 which may be further processed into various end products. A binder or other material may be delivered onto the fibers 36 by applicators 37 of conventional construction. If desired, the groups of filaments 32 may be gathered into a strand, bundle or several strands and the strand or bundle wound upon a forming tube on a conventional winding machine, or several strands wound into a roving.

The rotor construction and associated components are particularly illustrated in FIG. 3. The stationary support sleeve 18 provides a mounting means for antifriction bearings 40 and 41. The rotor construction 22 is carried by the tubular sleeve or quill 19, the sleeve or quill 19 being journally supported for rotation by the antifriction bearings 40 and 41. Surrounding the lower end region of the quill 19 is a member or collar 46 fixedly secured to the quill by suitable securing means.

The rotor or spinner construction is inclusive of a receptacle means or spinner section 49 which is of hollow circular cylindrical shape and of thin wall construction. The peripheral wall 50 of the spinner section 49 is fashioned with circumferentially arranged groups of orifices 52 in stacked relation through which heat-softened glass contained in the spinner section 49 is delivered laterally by centrifugal forces in the form of groups of fine streams or bodies of glass.

The thin-walled spinner section 49 is fashioned of metal or alloy capable of withstanding the high temperature molten glass, and an alloy of platinum and rhodium has been found to be satisfactory for the purpose.

In addition to the spinner section 49, the rotor construction is inclusive of metal members or means providing surfaces for absorbing and transferring radiant heat away from the glass of the streams to increase the viscosity of the glass. In the embodiment illustrated, the means comprises an upper annular plate 56, a lower annular plate 58 and annular plates 59 and 60 arranged in vertically spaced relation. The annular plates serve as metal fins or metal shields for absorbing heat from the glass streams. The upper plate 56 is preferably insulated from direct contact with the spinner section 49 by a circular row of blocks 62 of high temperature resistant refractory such as zircon, and the lower plate 58 insulated from direct contact with the spinner section 49 by a second circular row of blocks 64 of refractory material.

Disposed above and engaging the plate 56 is an annular mounting plate or member 66 secured to the collar 46 by bolts 67 or other suitable means. Disposed below and contiguous with the plate 58 is an annular plate 69. As shown in FIG. 3, the spinner section 49 is fashioned with an annular floor portion 73 and a depending circular portion 74 terminating in a flange 75 which is anchored by a plate 76 and screws 77 to the plate 69, the portion 74 defining an opening 78.

As shown in FIG. 3, the glass of the stream 29 impinges the floor 73 of the spinner section 49 and is moved by centrifugal forces into contact with the inner surface of the peripheral wall of the spinner section 49 providing a film of heat-softened glass adjacent the orifices 52. The annular plates 59 and 60 are preferably spaced from the peripheral wall 50 of the spinner section 49, and members 79 of high temperature resistant refractory, such as zircon, disposed between the exterior surface of the peripheral wall of the spinner section and the inner circular edge regions of the annular plates 59 and 60.

The arrangement is inclusive of means partitioning the regions between the pairs of annular plates 56, 59, 60 and 58 providing compartments or chambers in stacked relation whereby each group of glass streams from the orifices 52 is projected outwardly of the spinner section into and through a compartment, isolating chamber or fiber-forming region. FIG. 4 illustrates the circular plate 58, and portions of the plates 56, 59 and 60. Disposed between plates or members 58 and 60 are laterally extending partitions 82, and between plates 59 and 60 are partitions or members 84, and between members 56 and 59 are partitions or members 86. The inner ends of the partitions 82, 84 and 86 are preferably spaced slight distances from the spinner wall 50 and members 85 of high temperature resistant refractory disposed between the inner ends of the partitions and the spinner wall.

The assemblage of annular plates and laterally extending partitions provide vertically spaced, stacked groups of chambers or fiber-forming regions in indicated in FIG. 3 at 88, 90 and 92, the chambers being disposed circumferentially and laterally of the peripheral wall 50 of the spinner.

The assemblage of plates 56, 58, 59, 60, the upper and lower reinforcing plates 66 and 69 and the partitions 82, 84 and 86 are secured in stacked relation shown in FIG. 3 by means of bolts 70 arranged in pairs, the bolts receiving securing nuts 71. The assemblage of plates and partitions between the reinforcing plates 66 and 69 is further reinforced by bolts 72.

As particularly shown in FIG. 3, the orifices 52 are provided in circumferentially spaced groups 93, the groups being in vertically spaced stacked relation as shown in FIG. 3. Thus, a group 93 of orifices 52 are in registration with each of the chambers 88, 90 and 92 provided between each pair of partitions of the three stacked rows of partitions whereby a group of streams is projected by centrifugal forces into each of the chambers 88, 90 and 92. As particularly shown in FIGS. 4 and 5, each of the partitions 82, 84 and 86 extends outwardly from the peripheral wall 50 of the spinner 49, each partition being arranged at an angle or askew with respect to a radial position 83 indicated in FIG. 5 forming trapezoidal-shaped chambers 88, 90 and 92.

The outwardly flaring chambers or compartments 88, 90 and 92 defined by adjacent pairs of partitions accommodate the outwardly moving filaments attenuated from the streams delivered from the groups of orifices. The rotor or spinner assembly including the spinner section 49, the vertically spaced annular plates and the groups of laterally extending partitions provides a fiber-forming unit rotating in the direction, indicated by the arrows in FIGS. 4 and 5, at a speed, for example, of three thousand or more revolutions per minute.

The chambers or compartments between adjacent partitions and annular plates provide isolated fiber-forming regions whereby the air in such chambers or compartments tends to rotate with the spinner assembly so that the "air drag" on the filaments in the fiber-forming regions is greatly reduced.

The filaments however, upon outward movement beyond the outer ends of the partitions are subjected to "drag" or friction of the ambient air at the periphery of the rotating assembly and such friction results in a traction effort exerted on the attenuated fibers or filaments and the glass streams within the compartments tending to deflect the filament portions within the compartments in directions askew to a true radial direction. This angular movement of the filaments is accommodated by the askew positioning of the partitions 82, 84 and 86, such arrangement substantially eliminating interference of the several fibers or filaments of a group moving through the isolating compartments or fiber-forming regions.

Figure 5:
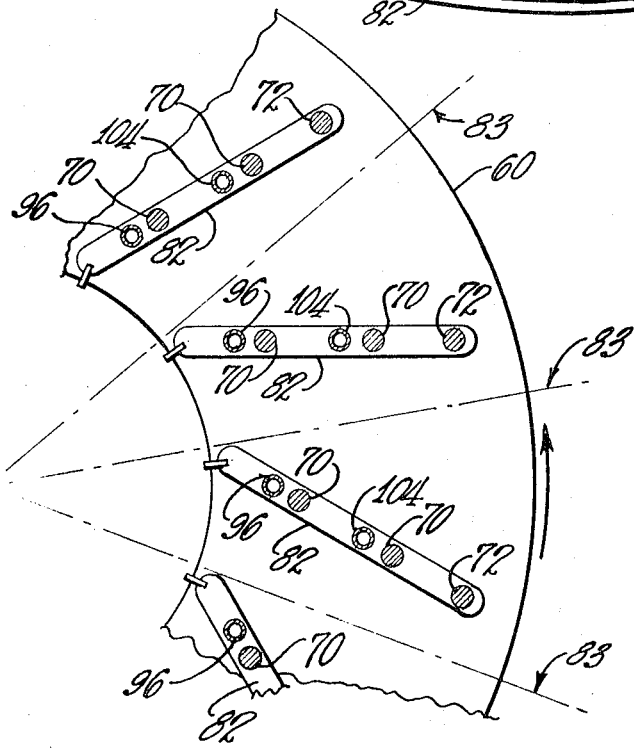
FIG. 5 is a fragmentary sectional view of a portion of the rotor construction as viewed upwardly of the rotor illustrating partition means defining chambers for the filaments.

The askew relationship of the partitions 82 engaging the annular plate 60 is illustrated in FIG. 5. The extent or angularity of the askew relationship of the partitions is indicated in FIG. 5 by the radial lines 83. The relative angularity of the partitions from the radial lines is such as to prevent engagement of the filaments with the rotating partitions.

The drag of the ambient air on the filaments adjacent the peripheries of the annular plates provides an attenuating force acting on the glass streams in addition to the centrifugal forces of attenuation. The drag of the ambient air on the fibers or filaments causes the filaments to engage the tip surfaces or extremities of the partitions 82, 84 and 86 resulting in converging the filaments toward the top surfaces.

If desired, a groove may be provided in the tip or extremity of each partition to converge each group of filaments into a strand or bundle. If it is desired to maintain the filaments in individual separated relation, the tips or extremities of the partitions may be serrated to accommodate the filaments. The continuous filaments of the groups may be wound upon a rotating collector or tube of a conventional winding machine as a strand or as a roving.

In order to efficiently produce fine filaments through the use of centrifugal forces, the glass in the spinner section and the streams at their region of delivery from the orifices are in a highly fluid or low viscosity condition, an essential factor promoting the delivery of streams of uniform size under the influence of centrifugal forces. The glass of the streams, in a highly fluid or low viscosity condition, are not readily attenuable into filaments because of low surface tension.

An important feature of the present invention lies in the method of transferring and conveying away radiant heat from the glass of the streams and thereby increase the viscosity of the glass so that the streams may be attenuated into fine filaments by centrifugal forces. The invention embraces a method of transferring radiant heat from the streams and filaments to heat-absorbing surfaces and conveying away the transferred heat by a circulating fluid so as to quickly and effectively increase the viscosity of the glass of the streams.

As shown in FIG. 3, the plate or member 69 is fashioned with a first circular groove, recess or channel 94 and a second circular groove, recess or channel 95 concentric with the channel 94 and the spinner wall 50.

The annular plates 56, 59, 60 and 58 are fashioned with aligned openings and the partitions 82, 84 and 86 likewise fashioned with aligned openings to accommodate tubes or tubular means 96 which, as shown in FIG. 3, extend through the above-mentioned aligned openings in the plates and partitions. Each of the partitions accommodates one of the tubes 96 and the lower end of each of the tubes is in registration with the circular channel 95. The upper open ends of the tubes 96 are in communication or registration with a circular space or recess 97 provided in the mounting plate 66.

The annular plates 56, 59, 60 and 58 and the partitions 82, 84 and 86 are also fashioned with aligned openings which snugly accommodate tubes or tubular means 104, as shown in FIG. 3. The lower ends of the tubes 104 are in registration with the circular channel 94. The lower plates 69 is fashioned with circumferentially spaced, radially disposed channels or passages 106 at regions spaced from the bolts 70 and in communication with the concentric channels 93 and 94. The tubes 104 extend upwardly through openings in the support plate 66 and are preferably fashioned with elbow portions 108 directed outwardly from the axis of the rotor construction providing outlets 109.

Arranged above the quill section 19 is a manifold 98 equipped with one or more nozzles 99 for delivering a cooling or heat absorbing fluid 100, such as water, continuously supplied to the manifold 98, the water flowing downwardly along the inner surface of the quill section 19 of the rotor construction.

Disposed adjacent and surrounding the support sleeve 18 is an annular plate 112 secured to the support sleeve by 113 or other suitable means; the plate 112 having circumferentially spaced vent openings 114. Secured to the peripheral region of the plate 112 is a circular troughlike member 115 having an inwardly extending skirt portion 16 terminating adjacent and below the outlet regions 109 of the tubes or tubular members 104, the member 115 providing a liquid-collecting chamber 117. Extending through an opening in the member 115 and terminating in the lower region of the chamber 117 is a pipe 118 connected with a suction pump 119 of conventional character.

When the rotor or spinner construction is rotated and water or other cooling liquid 100 from the nozzle 99 flows downwardly along the interior surface of the quill section 19, the water, under the influence of centrifugal forces, flows through the recess 97 downwardly through the tubes 96 outwardly through the radial passages or channels 106, thence upwardly through the tubes 104 and is delivered through the outlets 109 into the circular chamber 117 provided by the stationary trough 115. The pump 119, connected with the pipe 118, withdraws the water or other liquid collected in the chamber 117, the water being cooled by conventional means (not shown) and returned to the manifold 98 for recirculation through the above-described tubes and passages.

Thus, the circulating cooling liquid conveys away heat transferred from the hot glass streams to the partitions and annular members or plates so as to rapidly reduce the temperature of the glass streams at their regions of delivery from the orifices in the spinner section 49 thereby increasing the viscosity of the streams to an extent that the filaments may be efficiently attenuated from the glass of the streams at the proper viscosity.

The rate of conveyance of heat away from the rotor construction in the manner above described may be controlled by regulating the rate of flow of water or other cooling fluid delivered to the manifold 98 by conventional valve means 120. Through the method above described of circulating heat-absorbing liquid through passages and channels, the liquid does not come in contact with the streams of glass or the filaments attenuated therefrom.

Provision is made for applying heat to the glass within the spinner section 49 to compensate for heat losses from the glass of the stream 29 and to maintain the glass in the spinner section at a comparatively high temperature and low viscosity suitable for the formation of glass streams of uniform size delivered through the orifices 52 of the spinner. A stationary electrically energizable induction heater 121 is disposed with the spinner section 49 and is supported by conductors 122, the latter being suspended from bus bars 124 disposed above the sheave 23 at the upper end of the quill section 19. The bus bars are supplied with electric current in a conventional manner.

It is to be understood that other means may be employed for applying heat to the glass in the spinner section. For example, combustion burners of conventional construction may be supported within the spinner section 49 and disposed to direct heat onto the glass in the spinner section.

The arrangement illustrated is of substantial size so as to obtain a high yield of substantially continuous fibers or filaments to render the process commercially economical. The spinner section may be of a diameter of about 7 inches or more and the annular plates providing the heat absorbing surfaces of 18 inches or more in diameter. As the plates 66, 56, 59, 60, 58, 69 and the partitions are subjected to the circulating cooling fluid, such as water, the plates and partitions are maintained at reduced temperatures and hence, may be fashioned of aluminum, steel or other suitable inexpensive metal so as to reduce the cost of the rotor construction.

The annular plates 56, 58, 59, 60 and the partitions 82, 84 and 86 provide lateral support for the peripheral wall 50 of the spinner 49. This arrangement enables the use of a comparatively thin-walled spinner of platinum-rhodium alloy thereby effecting substantial reduction in the cost of the construction. The lateral support for the spinner section prevents distortion of the spinner wall. As the compartments or chambers provided by the annular plates and partitions tend to isolate the glass streams from "air drag" of ambient air, there is a minimum of wear of the alloy defining the orifices 52 in the spinner wall whereby the useful life for the spinner is greatly prolonged.

As the filaments formed from the glass streams are attenuated by centrifugal forces, the filaments are not subjected to the tension forces present when continuous filaments are mechanically wound into a package as in prior methods of mechanically attenuating continuous filaments from glass streams. While the attenuated filaments formed by the above-described process may be wound upon a mandrel in package formation, the packaging collector may be rotated at a speed to collect the filaments in a wound package without accumulated tension being encountered in the package as the winding of the filaments performs no attenuating function.

If desired, a size or coating may be applied to the downwardly moving filaments 32 by suitable applicators (not shown) of conventional construction for directing the size or coating onto the filaments at a region beneath the rotor construction, or binder coating material applied by nozzles 37 in the manner hereinbefore mentioned, depending upon the end use for the fibers or filaments.

It is apparent that, within the scope of the invention, modifications and different arrangements may be made other than as herein disclosed, and the present disclosure is illustrative merely, the invention comprehending all variations thereof.

I claim:

1. The method of processing heat-softenable fiber-forming material including the steps of delivering heat-softened material to a rotating body, projecting streams of the heat-softened material from the body by centrifugal forces, transferring heat from the streams to rotating surfaces surrounding the rotating body to increase the viscosity of the material of the streams, circulating a liquid through passages in heat-transferring relation with the rotating surfaces for conveying away heat transferred to the surfaces from the streams, and attenuating the material of the streams to fibers.

2. The method of processing heat-softened glass to form fibers including delivering streams of heat-softened glass from a supply through a moving chamber, transferring heat from the glass of the streams to the surfaces defining the chamber to raise the viscosity of the glass, moving a liquid through passages in heat-transferring relation with the surfaces and out of contact with the glass for conveying away heat transferred to the surfaces from the glass, and attenuating the streams to fibers.

3. The method of processing heat-softened glass to form including feeding heat-softened glass into a chamber, rotating the chamber to project streams of the heat-softened glass from the chamber by centrifugal forces, projecting groups of the streams through compartments, rotating the surfaces defining the compartments, transferring heat from the streams moving through the compartments to the rotating surfaces, circulating liquid in heat-transferring relation with the rotating surfaces and out of contact with the streams of glass for conveying away heat transferred to the surfaces to raise the viscosity of the glass of the streams, and attenuating the streams to fibers by centrifugal forces.

4. The method of processing heat-softened glass to form fibers including feeding heat-softened glass into a chamber, rotating the chamber to project streams of the heat-softened glass by centrifugal forces from the chamber through walled compartments rotating with the chamber, circulating liquid in heat-transferring relation with the walled compartments and out of contact with the projected streams for transferring heat from the streams to the liquid to raise the viscosity of the glass of the projected streams, and attenuating the glass of the streams to fibers by centrifugal forces.

5. Apparatus of the character disclosed including, in combination, a rotor construction comprising a spinner section and a quill section, means journally supporting the rotor construction, means for delivering heat-softened glass to the spinner section, said spinner section having orifices through which streams of glass are projected from the spinner section, a plurality of spaced members extending from the spinner section and disposed adjacent the streams projected from the orifices, passage means in said members accommodating heat-absorbing fluid whereby heat from the streams transferred to the members is conveyed away by the fluid to increase the viscosity of the glass of the streams, means for rotating the spinner section and the members, said spinner section being rotated at a speed to attenuate the projected streams to fibers by centrifugal forces.

Apparatus of the character disclosed including, in combination, a support, a rotor construction including a spinner section journaled for rotation on the support, means for feeding heat-softened glass to the spinner section, said spinner section having orifices through which streams of glass are projected by centrifugal forces from the spinner section, a plurality of annular members embracing the spinner section and disposed adjacent the streams of glass projected from the orifices, means for rotating the rotor construction, outwardly extending partitions disposed between adjacent annular members providing walled chambers through which the streams of glass are projected, said members and partitions being in heat-transferring relation with the streams of glass whereby heat from the streams is transferred to the annular member and partitions, passage means in said annular members and said partitions, and means for delivering a heat-absorbing liquid for circulation through said passage means to convey away heat transferred to said annular members and partitions, said rotor construction being rotated at a speed effective to attenuate the projected glass streams to substantially continuous filaments.

7. The combination according to claim 6 including means for collecting liquid from said passage means for recirculating through the passage means.

8. The combination according to claim 6 including means for applying heat to the glass in the spinner section.

9. The combination according to claim 6 wherein the rotor construction includes a quill section, and means for delivering cooling liquid to the interior of the quill section for circulation through the passage means.

10. The combination according to claim 6 including heat-insulating means disposed between the spinner section and the annular plates and partitions.

11. The combination according to claim 10 wherein the insulating means comprise members of refractory.

12. A fiber-forming unit including, in combination, a hollow spinner journally supported for rotation to contain heat-softened fiber-forming material, said spinner being formed with orifices through which streams of the material are projected, means extending outwardly from the spinner providing segment-shaped fiber-forming regions, said means comprising rotating surfaces surrounding the spinner and partitions between the surfaces, said means being in heat-transferring relation with the streams of material, and means defining passages in said surface and partitions for accommodating heat-absorbing fluid.

* * * * *